April 14, 1964    T. TOGNOLA    3,129,347
MAGNETO-ELECTRIC MOTION DETECTING TRANSDUCER
Filed July 20, 1960
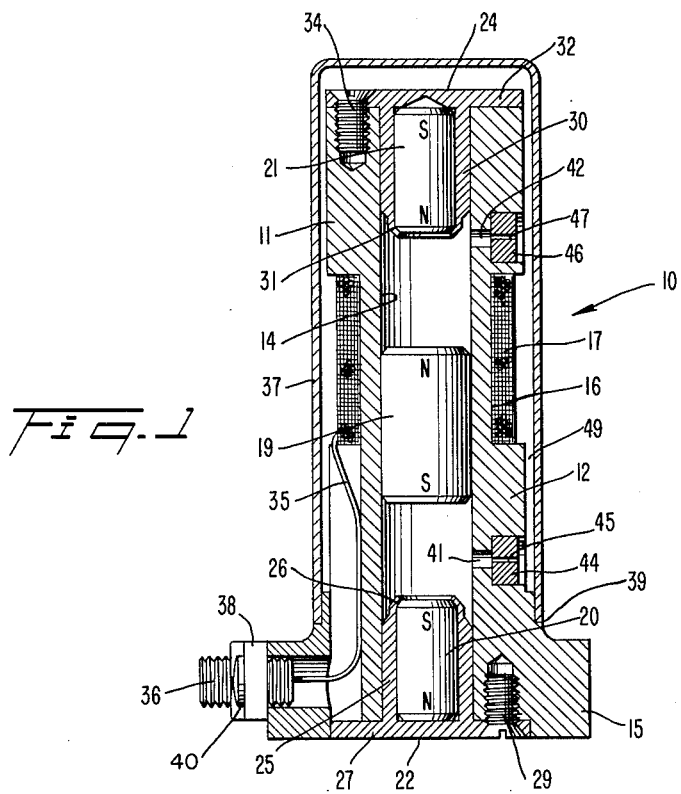
Fig. 1
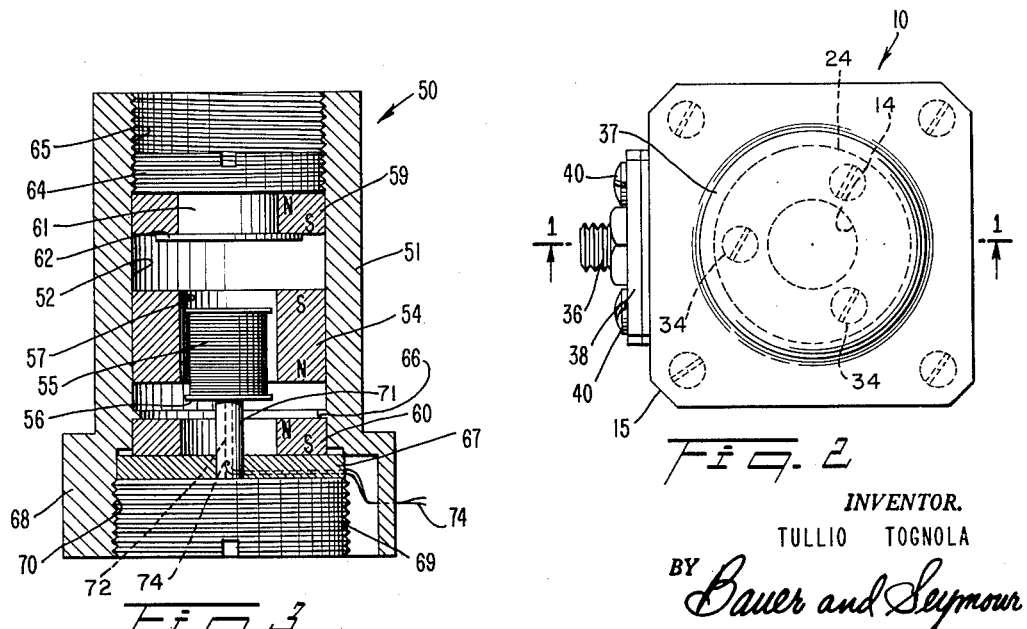
Fig. 3
Fig. 2
INVENTOR.
TULLIO TOGNOLA
BY Bauer and Seymour
ATTORNEYS

United States Patent Office 3,129,347
Patented Apr. 14, 1964

3,129,347
MAGNETO-ELECTRIC MOTION DETECTING
TRANSDUCER
Tullio Tognola, Sidney, N.Y., assignor to The Bendix
Corporation, Sidney, N.Y., a corporation of Delaware
Filed July 20, 1960, Ser. No. 44,138
14 Claims. (Cl. 310—15)

This invention relates to a motion-detecting transducer of the magnetic type. The transducer of the invention is adapted to receive and detect mechanical vibrations and to transform the vibrations thus received into an electrical signal which can be detected and/or recorded.

The invention has among its objects the provision of a novel motion-detecting transducer of the magnetic type.

A further object of the invention lies in the provision of a transducer of the type indicated which is characterized by its simplicity, by the economy with which it may be made and maintained, and by the accuracy of the electrical response generated by it when it is subjected to mechanical vibrations.

Still a further object of the invention lies in the provision of an improved magnetic vibration detecting transducer which possesses a long, trouble-free life under arduous working conditions.

Another object of the invention lies in the provision of a magnetic vibration detecting transducer wherein a movable magnetic element is impelled toward its central or neutral position by magnetic field-producing means, whereby the transducer may be made free of springs with their attendant operational limitations.

Yet another object of the invention lies in the provision of a vibration-detecting transducer which has a voltage output which does not vary substantially over a wide range of variation of the frequency of mechanical vibrations to which it is subjected.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in longitudinal axial section through a first embodiment of transducer made in accordance with the invention, certain of the parts of the transducer being shown in elevation;

FIG. 2 is a view in top plan of the transducer of FIG. 1; and

FIG. 3 is a view in longitudinal axial section through a second embodiment of transducer made in accordance with the invention, certain of the parts being shown in elevation.

The two embodiments of transducer shown may be employed to advantage, for example, as the vibration-detecting pick-up of so-called analyzing apparatus for jet type engines. In such application the pick-up is mounted in a suitable holder (not shown) which is attached to the block of the engine in such manner that vibrations of the engine cause the movable element of the pick-up to vibrate about the neutral point of such element. It is to be understood, however, that the transducer of the invention is capable of use to advantage in a large number of other applications.

The first embodiment of transducer, shown in FIGS. 1 and 2, is generally designated by the reference character 10. Although transducer 10 is shown disposed in a vertical position, it is to be understood that in use it will preferably be mounted so that its longitudinal axis extends generally in the direction of the vibration to be observed, such as normal to the axis of the engine, parallel to it, etc. Transducer 10 has a hollow tube-like body 11 made of non-magnetic materail such as non-magnetic stainless steel. Body 11 has a lower barrel portion 12 and a laterally enlarged base 15, the barrel and base having an axially extending bore 14 therethrough. An annular outer groove 16 is provided in barrel 12 intermediate its length, there being a wound pick-up coil 17 disposed in the groove.

Slidably but accurately mounted within bore 14 is an element 19 in the form of a permanent bar magnet having poles of opposite polarity at its two ends. Element 19 may be made, for example, of Alnico, and may be coated, as by being nickle plated, to reduce the tendency of the magnet to chip and to give it long wearing characteristics. The inner wall of bore 14 of the barrel may also be treated as by being nitrided to give it a hard, long wearing surface. Magnetic element 19 is held in place in generally its neutral position by means of first and second permanent magnets 20 and 21 affixed to opposite ends of body 11 as shown. As indicated, elements 20 and 21 are in the form of cylindrical bar magnets and are positioned spaced from and coaxial with element 19. The poles at the ends of magnets 20 and 21 are of the same polarity as those of element 19 which they confront, whereby the fixedly positioned magnets tend to repel movable magnet 19. In the illustrative preferred embodiment, fixed magnets 20 and 21 have substantially the same field strength, and so in its neutral position element 19 lies substantially midway between elements 20 and 21, as shown.

Fixed magnet 20 is retained in position by lower closure member 22, which is also made of non-magnetic material, and fixed magnet 21 is retained by a substantially similar upper closure member 24. Closure member 22 has a central, axially extending sleeve portion 25 integral therewith and snugly fitting within the lower end of bore 14 as the transducer is shown in FIG. 1. Fixed magnet 20 fits within sleeve 25 and is retained in position therein by the upper end portion 26 of the sleeve which is of reduced wall thickness and is flanged inwardly to lie partially across the upper end of magnet 20. Preferably, magnet 20 is further held in place by a suitable adhesive which is interposed between such magnet and the inner wall of sleeve 25. Closure member 22 has a circular laterally extending flange 27 thereon, such flange being sealingly received within a correspondingly shaped seat in the lower surface of base 15 of the body, the closure member being retained on the body by screws 29, as shown.

As noted, the upper closure member 24 is substantially the same as member 22. The closure member 24 has a centrally directed sleeve portion 30 within which magnet 21 is positioned, and an inwardly flanged end 31 which positively retains magnet 21. A laterally extending circular flange 32 overlies the end of barrel 12, the upper closure member being sealingly retained on the barrel by screws 34.

The pick-up coil 17 ordinarily requires only one lead wire 35 thereto, since the other end of the coil may be connected to the body of the transducer which thus serves as the other lead to the coil. Lead wire 35 is brought up through a longitudinally extending groove in barrel 12 and thence outwardly to a connector element 36 which is attached to base 15 of the barrel by an insulating mounting plate 38. Plate 38 is secured to base 15 by screws 40, as shown in FIG. 2. Element 36 may conveniently be one part of a two-part separable electrical connector by which the transducer may be connected to the input lead of an analyzer circuit.

The transducer is completed by an elongated cup-like housing 37 within which the main extent of barrel 12 is telescoped. Housing 37 is sealed to body 11 by means of an annular weld 39 between the body and the lower edge of the housing. There is thus presented a transducer of sealed construction which is free from operating difficulties caused by the intrusion of moisture, dirt, etc. It is preferred that housing 37 be made of magnetic metal such as iron or magnetic stainless steel, whereby to shield magnets 19, 20, and 21 from the action of stray magnetic fields.

The transducer 10 of FIGS. 1 and 2 also provides for the air damping of the movable magnetic element 19. In the embodiment shown, the barrel 12 is provided with a first opening 41 through the sidewall thereof in a location between movable magnet 19 and fixed magnet 20, and with a second opening 42 through the sidewall thereof in the location between movable magnet 19 and fixed magnet 21. Each of such openings is counterbored as shown, there being an insert 44 in passage 41 and an insert 46 in passage 42. Insert 44 has a smaller passage 45 therethrough, and insert 46 has a similar passage 47 therethrough. The outer ends of passages 45 and 47 communicate with the space 49 between body 11 and housing 37, which thus in effect provides a sump for the thus-formed dash dot arrangement. When the movable element 19 moves downwardly (as it is shown in FIG. 1) air between magnet 19 and closure means 22 is compressed and escapes into the sump through passage 45. At the same time air from the sump will tend to travel inwardly therefrom through passage 47 into the space between magnet 19 and closure means 24. The reverse action takes place when movable magnet 19 travels upwardly. A damping effect is thus imposed upon element 19, such damping tending to prevent the movable magnet from overshooting or regenerative action.

A second embodiment of transducer in accordance with the invention is shown in FIG. 3. Such transducer, there designated 50, has a tubular body 51 made of non-magnetic metal. Body 51 has a central, axially extending bore 52 therethrough. An annular permanent magnet 54, made, for example, of Alnico and having opposite magnetic poles at its ends, is slidably mounted within bore 52. A pick-up coil 55 is, in this embodiment, fixedly mounted within the annular magnet 54 and held in a manner to be described. Coil 55 is wound upon a coil spool 56 made of magnetic metal and having end flanges of somewhat smaller diameter than the central bore 57 through magnet 54. Movable magnet 54 is held at a neutral position, when the transducer is not subjected to mechanical vibrations, by being located between an upper fixed permanent magnet 59 and a similar lower fixed permanent magnet 60. Both such magnets 59 and 60 are magnetized so that their opposite upper and lower ends form magnetic poles of opposite polarity. The fixed and movable magnets are so positioned that the confronting poles of the movable and fixed magnets are of the same polarity, whereby they repel each other.

Upper fixed magnet 59 is retained by a central spool 61 having a lower flange 62 underlying the magnet. The upper end of spool 61 is centrally attached to an internal nut 64 which has adjustable screw threaded engagement with the internally threaded sidewall 65 of the upper end of body 51. The spacing of magnet 59 relative to the neutral position of movable magnet 54 can thus be varied appreciably by turning nut 64 within body 51.

The lower fixed magnet 60 is fixedly retained within the lower end of bore 52 in body 51 by being thrust against an internal flange 66 on the body by an internal nut 69 acting through a washer-like spacer member 67. Nut 69 has screw threaded engagement with the internally threaded sidewall 70 of the lower enlarged end portion 68 of body 51. In the embodiment shown, nut 69 also furnishes support for the spool 56 of coil 55, there being a central, axially directed hollow stem 71, made of non-magnetic metal, attached to nut 69, extending through spaced member 67, and secured to spool 56 of the coil. The coil may have one terminal thereof electrically connected to the body 51. The other lead wire, designated 74, may be brought outwardly of the body through an axial passage 72 in stem 71 and thence laterally through a groove in member 67 and then through the sidewall of body 51 at the lower end thereof. Lead wire 74 may be connected to a separable connector part, not shown, secured to body 51, and the body 51 of transducer 50 may, if desired, be telescoped within and sealed to a cup-like magnetic shielding and protective housing similar to that shown at 37 in FIG. 1.

It will be apparent that both disclosed embodiments of transducer operate in substantially the same manner. When the body or shell of the transducer is subjected to mechanical vibrations having components of motion axially of the transducer, the body thereof, including the two fixed magnets at its opposite ends, and the coil tend to travel relative to the movable magnet. Relative travel between such movable magnet and the coil fixedly positioned with respect to the transducer body causes the turns of the coil to cut lines of magnetic flux of the movable magnet, thereby to induce a voltage in the coil. The direction, duration, and amplitude of such induced voltage give an accurate indication of the characteristics of the mechanical vibrations which have caused them.

The construction of the transducer in both disclosed embodiments, wherein the movable magnet is centrally located by opposed fixed magnets is particularly advantageous since it eliminates the use of springs which were formerly necessary to locate the movable magnet in its neutral position. Such springs were disadvantageous for a number of reasons: The springs possessed a resonant frequency and thus in certain zones of the range of the frequency of the applied mechanical vibrations tended either to augment or detract from the response of the transducer to the mechanical vibrations. Further, springs tend to become fatigued after appreciable periods of use, so that the response of a transducer provided with such springs changes appreciably over its useful life. Finally springs are affected by high temperatures, and lose their calibration at high temperatures on the order of 800° F. The magnetic fields between the fixed and movable magnets of the transducer of the present invention, of course, have no mass and no resonant frequency, so that they are not subject to any difficulties arising from resonant frequency. Further, magnets 19, 20 and 21 successfully withstand elevated temperatures, on the order of 800° F. and above, and thus retain substantially their initial field strengths over long periods of use, so that the transducer yields substantially the same response over a long useful life.

It has been found that transducers made in accordance with the invention have voltage outputs which do not vary substantially over a wide range of variation of the frequency of the mechanical vibrations to which they are subjected. This, of course, is highly desirable. It is believed that such result follows in part from the lack of positioning springs for the movable magnet, and thus the elimination of problems as to the resonant frequency of such springs. Such result also appears to result in part from the compression characteristics of the field between opposed permanent magnets, which are different from those of mechanical compression springs. A spring within its operative range of deformation obeys Hooke's law, that is, its deflection is proportional to the stress applied thereto. With opposed permanent magnets, on the other hand, the repelling force between the magnets is inversely proportional to the square of the distance between them. As a result the movable magnet of the transducer of the present invention never "bottoms" against either of the fixedly positioned permanent magnets, and in positions of displacement of the movable magnet the latter is urged toward its central neutron position with a force which is much greater than that which would be yielded by a comparable coil compression spring.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A vibration-detecting transducer, which comprises an elongated cylindrical non-magnetic tubular housing, means fixedly mounting an annular pick-up coil coaxial of the housing and intermediate the length of the housing, a circular permanent magnet fitting within the housing and slidable longitudinally therewithin substantially free of mechanical restriction of such sliding movement, said movable magnet being flux coupled to the coil and having opposite poles at opposite ends thereof, two circular permanent magnets beyond the opposite ends of the movable magnet and fixedly connected to the housing, the ends of the fixed magnets confronting the ends of the movable magnet being spaced from the ends of the movable magnet and being poles of the same polarity as the ends of the movable magnet which they confront.

2. A vibration detecting transducer as claimed in claim 1, wherein the movable magnet is coaxial of the coil, and when the movable magnet is at rest it lies in general transverse alignment with the coil.

3. A vibration detecting transducer as claimed in claim 2, wherein the confronting poles of the movable and fixed magnets have generally the same areas and are of similar configuration.

4. A vibration detecting transducer, which comprises an elongated cylindrical non-magnetic tubular housing, means fixedly mounting an annular pick-up coil coaxial of the housing and intermediate the length of the housing, a circular permanent magnet accurately fitting within the housing and slidable longitudinally therewithin substantially free of mechanical restriction of such sliding movement, said movable magnet being flux coupled to the coil and having opposite poles at opposite ends thereof, two circular permanent magnets beyond the opposite ends of the movable magnet and fixedly connected to the housing, the ends of the fixed magnets confronting the ends of the movable magnet being spaced from the ends of the movable magnet and being poles of the same polarity as the ends of the movable magnet which they confront, the housing presenting an essentially gas-tight compartment at each end thereof immediately communicating with the respective end of the movable magnet, and calibrated passages through the wall of each compartment appreciably spaced from the rest position of the movable magnet providing for the restricted escape of gas from the restricted ingress of gas into said compartments upon reciprocation of the movable magnet.

5. A vibration detecting transducer comprising an elongated non-magnetic hollow cylindrical housing, an annular pick-up coil fixedly mounted exteriorly of the housing intermediate its length and generally coaxial thereof, a cylindrical movable permanent magnet substantially accurately fitting within the housing for movement longitudinally thereof, said movable permanent magnet being flux coupled to the coil and having opposite poles at opposite ends thereof, the movable permanent magnet being substantially free from mechanical restriction in its movement longitudinally within the housing, and two permanent magnets at opposite ends of the movable magnet and fixedly mounted with respect to the coil, the ends of the fixed magnets confronting the ends of the movable magnet, being spaced from the ends of the movable magnet, and having poles of the same polarity as the ends of the movable magnet which they confront whereby floatingly to retain the movable magnet between them.

6. A vibration detecting transducer as claimed in claim 5, wherein the fixed magnets are cylindrical and have diameters substantially the same as that of the movable magnet, and the fixed magnets are positioned within the housing at opposite ends of the movable magnet.

7. A vibration detecting transducer, which comprises an elongated non-magnetic cylindrical housing, a movable annular permanent magnet substantially accurately fitting within the housing for movement substantially free from mechanical restriction along the axis of the housing, a pick-up coil, means connected to the housing fixedly mounting the pick-up coil within the movable magnet and substantially coaxial thereof, the movable magnet being flux coupled to the coil and having opposite poles at opposite ends thereof, and two annular magnets generally aligned with the movable magnet and fixedly mounted with respect to the coil, the ends of the fixed magnets confronting the ends of the movable magnet being spaced from the ends of the movable magnet and being poles of the same polarity as the ends of the movable magnet which they confront, whereby floatingly to retain the movable magnet between them.

8. A vibration detecting transducer as claimed in claim 7, wherein the fixed magnets are annular, having a configuration generally similar to that of the movable magnet, and are mounted within the housing beyond the opposite ends of the movable magnet.

9. A magneto-electric motion detecting transducer comprising a non-magnetic housing having a cylindrical space therein, a pair of magnets fixedly mounted in said space and in spaced relation to each other, a third generally cylindrical magnet having a close sliding fit in said cylindrical space between said pair of magnets and free to move in said space between said pair of magnets substantially free of mechanical restriction, the magnetic poles of said magnets being so arranged that the third magnet is magnetically repelled by both magnets of said pair, whereby said third magnet floats between and in spaced relation to the magnets of said pair, and a pick-up coil fixedly mounted relative to said pair of magnets and in magnetic flux coupled relation to said third magnet, whereby electrical energy is generated in said coil upon relative movement of the coil and said third magnet.

10. A transducer as defined in claim 9 wherein the normal position of said third magnet is determined solely by the repelling action of the magnets of said pair.

11. A transducer as defined in claim 9 wherein the portions of said cylindrical space between opposite ends of said third magnet and the magnets of said pair are sealed from communication with the general atmosphere and are connected to each other only through flow restricting means to thereby pneumatically dampen the movements of said third magnet relative to the magnets of said pair.

12. A transducer as defined in claim 11 comprising means forming an inclosed space externally of said housing, and flow restricting passages in the housing connecting each of said portions to said enclosed space.

13. A transducer as defined in claim 9 wherein said housing comprises a closure member closing an end of said cylindrical space and a cylindrical flange projecting from said member into said space and forming a seat for one of the magnets of said pair.

14. A transducer as defined in claim 13 wherein the free end of said flange is rolled inwardly to engage the marginal end portion of the magnet seated therein for securing the magnet in position.

References Cited in the file of this patent

UNITED STATES PATENTS

| | | |
|---|---|---|
| 503,213 | McKay | Aug. 15, 1893 |
| 1,619,677 | Pierce | Mar. 1, 1927 |
| 2,070,121 | Gibson | Feb. 9, 1937 |
| 2,852,243 | Shepard | Sept. 16, 1958 |
| 2,856,240 | Breazeale | Oct. 14, 1958 |
| 2,913,701 | Wachholz | Nov. 17, 1959 |
| 2,946,218 | Karpchuk | July 26, 1960 |
| 2,946,230 | Gilbert | July 26, 1960 |
| 3,065,366 | Speiser et al. | Nov. 20, 1962 |